(12) United States Patent
Russ et al.

(10) Patent No.: US 6,196,361 B1
(45) Date of Patent: Mar. 6, 2001

(54) COMPACT ELECTRIC ASYMMETRY BRAKE

(75) Inventors: David E. Russ; Lawrence J. Kintz, Jr.; Roy W. Diesner, all of Rockford, IL (US)

(73) Assignee: Sundstrand Corporation, Rockford, IL (US)

( * ) Notice: Subject to any disclaimer, the term of this patent is extended or adjusted under 35 U.S.C. 154(b) by 0 days.

(21) Appl. No.: 08/602,433

(22) Filed: Feb. 16, 1996

(51) Int. Cl.[7] ........................................................ B60L 7/00
(52) U.S. Cl. ........................ 188/161; 74/89.15; 244/75 R; 192/69.8; 192/114 R
(58) Field of Search ............................ 188/161, 163, 188/166, 180, 187; 75/89.15, 665 B; 244/75 R, 213, 214, 215, 76 R; 92/69.8, 96, 101, 114 R

(56) References Cited

U.S. PATENT DOCUMENTS

| | | | |
|---|---|---|---|
| 2,362,676 | * 11/1944 | Stechbart | 188/187 |
| 2,951,540 | * 9/1960 | Hawkins | 188/187 |
| 3,662,550 | 5/1972 | Lichtfuss | 60/53 R |
| 4,318,304 | * 3/1982 | Lang | 74/89.15 |
| 4,459,867 | 7/1984 | Jones | 74/89.15 |
| 4,603,594 | * 8/1986 | Grimm | 74/89.15 |
| 4,685,550 | * 8/1987 | Metcalf | 192/69.8 |
| 4,779,822 | 10/1988 | Burandt et al. | 244/75 R |
| 5,137,126 | * 8/1992 | Magnaval et al. | 188/187 |
| 5,484,043 | 1/1996 | Quick et al. | 188/187 |

* cited by examiner

Primary Examiner—Robert J. Oberleitner
Assistant Examiner—Pamela J. Lipka
(74) Attorney, Agent, or Firm—Lawrence E. Crowe

(57) ABSTRACT

An improved braking apparatus having a jaw type clutch coupled to an electrical solenoid through a ball spline mechanism provides significantly greater braking capacity in a given volume than other types of braking devices. The ball spline is configured to significantly reduce the internal friction load which the electrical solenoid must overcome to apply or release the brake, resulting in a smaller physical size and current draw of the solenoid. The jaw clutch and ball spline are also configured to reduce or absorb shock loads on various internal components of the braking apparatus when the brake is engaged. By configuring the ball spline and jaw clutch to function as shock absorbers in addition to performing their primary functions, the need for separate elastomeric shock absorbers, etc., is eliminated. The electrical solenoid utilizes a pair of strategically shaped and located conical surfaces on the plunger and electromagnetic core of the solenoid to provide an optimal balance between actuation force, stroke, and current draw, by placing the conical surfaces in such a manner that both the primary magnetic flux and the leakage flux generated by the electromagnetic coils combine and contribute to generating the actuation force exerted by the electrical solenoid. A bifilar winding within the electrical solenoid provides a substantially identical amount of actuation force for a given stroke and current draw, when the bifilar winding is provided with electrical current from either of two independent sources of electrical current. Drain passages and a coating that is resistant to retention of a condensate thereupon applied to the conical surfaces of the solenoid provide a mechanism for insuring that fluid condensing on the conical surfaces does not inhibit operation of the electrical solenoid.

29 Claims, 3 Drawing Sheets

COMPACT ELECTRIC ASYMMETRY BRAKE

TECHNICAL FIELD

This invention is related to actuation systems, and more particularly to a compact asymmetry brake for use in aircraft flight control actuation systems.

BACKGROUND

Modern aircraft wings often include a series of movable flight control surfaces, known as flaps or slats, that can be selectively extended or retracted to modify the lift producing characteristics of the wings. Extension and retraction of such flaps or slats is accomplished by a flight control actuation system mounted in the wing.

A typical actuation system includes a series of actuators spaced along the span of each wing, and operably connected to move one or more individual flight control surfaces. Adjacent actuators are connected to each other by drive shafts, to in essence form a chain of actuators and shafts extending along the span of the wing. A power drive unit (PDU) connected to the inboard end of the chain provides motive power for driving the actuators to selectively extend or retract the flight control surfaces.

Because control surfaces such as flaps or slats significantly alter the lift producing characteristics of the wings, it is critical for safe operation of the aircraft that the actuation system also include safety features for detecting and reacting to problems such as jamming, or failure of one of the actuators or drive shafts in the aircraft flight control system. Of particular concern are problems which cause the position of the flaps or slats on one wing to lose synchronization with the flaps and slats on the other wing of the aircraft. Such a condition is referred to as asymmetry. To prevent asymmetry, actuation systems for flaps and slats often include a device known as an asymmetry brake which engages to hold the chain of actuators and shafts in a known position, should a problem occur in the actuation system that cannot be corrected through use of the power drive unit alone. For example, should one of the shafts connecting adjacent actuators break, the PDU would not be able to control the position of flaps or slats outboard of the broken shaft. Without some means, such as an asymmetry brake at the outboard end of the chain of actuators and shafts, for holding the flaps or slats downstream from the broken shaft against further movement, aerodynamic loads acting upon the flaps or slats could move them to an uncommanded position which would create serious flight control problems for the aircraft.

U.S. Pat. No. 3,662,550 to Lichtfuss, U.S. Pat. No. 4,779,822 to Burandt et al., and U.S. Pat. No. 5,484,043 to Quick et al., describe flight control actuation systems and asymmetry brake devices such as those described above. As will be readily apparent from these patents, actuation systems for critical aircraft flight control surfaces, such as flaps and slats, are designed to have a high degree of redundancy for monitoring and reacting to problems which could lead to asymmetry.

On one recently designed aircraft, very narrow, supercritical, wings were utilized to minimize fuel consumption. The wings were so narrow at their tips, that there was not enough space within the wing for mounting an asymmetry brake at the outboard end of the chain or actuators and interconnecting shafts, as in prior flight control systems.

As a result, a novel approach was developed in which the asymmetry brake was positioned between the two outermost actuators, and the outermost actuator was provided with an integral no-back device to maintain position of the outermost actuator, in the event that the driving connection fail between the asymmetry brake and the outermost actuator. This actuation system is described in detail in co-pending patent application Ser. No. 08/602,190, which is assigned to the assignee of the present invention and incorporated herein by reference.

Even with the asymmetry brake repositioned between the two outermost actuators, however, there was still insufficient space within the wing to house an asymmetry brake of any known prior construction at the new location. It was, therefore, necessary to develop a new, more compact asymmetry brake.

In addition to making the brake physically smaller, a number of other design constraints made designing a new asymmetry brake for the new aircraft described above a significant challenge. The overall design of the flight control system required that the brake be applied and released several times during each flight of the aircraft. This requirement ruled out the use of many prior brake designs which could only be reset manually on the ground once they had been triggered in flight.

The actuators used on the new aircraft were of a type having little inherent friction and are thus readily backdrivable by aerodynamic loads. This created high backdriving loads which had to be reacted by the brake. Braking devices using friction plates, of the type utilized in some prior asymmetry brakes, having enough braking capacity to react the backdriving loads were physically too large to fit within the available space.

The large backdriving loads created an additional problem in that the actuator for engaging and disengaging the brake had to be capable of overcoming the large backdriving loads to apply or release the brake. The overall design of the flight control system required that the brake actuator be electrically operated. The small available space did not allow for the use of an electrical motor and geartrain. Existing electrical solenoid designs were physically too large, or required too much current. To make matters worse yet, the overall system design required that the electrical actuation means utilized in the brake incorporate redundant features which would allow the actuator to apply full rated engagement force when supplied with current from either of two sources of electrical current which were electrically isolated from one another. This meant that the solenoid had to have two separate windings, each capable of generating full rated force of the solenoid.

In its new location, the asymmetry brake had to include a thru-shaft, making attempts to diametrically shrink the size of the brake more difficult.

In addition to providing a design meeting the requirements listed above, it was also desired to provide an improved asymmetry brake which would significantly reduce the incidence of nuisance trips and irregular operation experienced with prior asymmetry brakes.

Accordingly, it is an object of our invention to provide an improved braking apparatus, suitable for use in an application such as the flight control actuation system for the new aircraft described above. It is also an object of our invention to provide such a braking apparatus that is physically compact, powerful, and highly reliable in a form that includes a minimal number of parts of straightforward design which can be produced at reasonable cost.

SUMMARY OF THE INVENTION

Our invention provides a braking device meeting the above requirements and objects through the use of a jaw type clutch coupled to an electrical solenoid through a ball spline mechanism.

The jaw type clutch provides significantly greater braking capacity in a given volume that other types of braking devices, such as those relying on friction. The particular jaw clutch utilized has negatively raked teeth which lock together upon engagement to positively prevent rotation of the shaft or the braking device. The locking and positive anti-rotation features of the jaw clutch in our braking device thus preclude the need for more complex mechanisms, such as ratchets or ball ramps, used in some prior braking devices to provide positive locking and anti-rotation. The jaw clutch in our invention thus allows a braking apparatus fabricated per our invention to be smaller, more reliable, and producible at lower cost than prior braking devices.

The ball spline mechanism of our invention significantly reduces the internal frictional load which the actuator means, such as the solenoid, must overcome to apply or release the brake. As a result, the physical size and current draw of the solenoid are reduced.

The jaw clutch and ball spline of our invention are also configured to reduce or absorb shock loads on the various internal components of the braking apparatus when the brake is engaged. Specifically, a rotating element of the jaw clutch is configured to minimize the rotational inertia which must be reacted when the brake is engaged. The rotating jaw is further configured to have its teeth mounted on torsionally flexible arms which twist to help absorb shock loads during engagement. The ball spline is configured to have flexible inner and outer races which bend elastically during engagement of the brake to absorb shock loads.

The shaft of the braking apparatus is also configured to have a long span with a narrow cross-section to work in concert with the shafts in the driveline in which the brake is installed to absorb torsional shock loads when the brake is engaged. By configuring the shaft, the ball spline and jaw clutch to function as shock absorbers while performing their primary functions, our invention eliminates the need for the separate elastomeric shock absorbers, etc., that are required in prior braking devices.

This internal shock absorber is one piece of the system's total shock absorber which also includes the narrow cross-section through shaft and the driveline shafts.

The solenoid of our invention provides more actuation force in a smaller package with less current draw than prior solenoid designs through the use of strategically placed conically shaped surfaces of the plunger and electromagnetic core of the solenoid. The conical surfaces also provide a longer stroke with less current draw than prior solenoids. The specific placement and cone angle of our solenoid strikes an optimal balance between actuation force, stroke, and current draw by placing the conical surfaces strategically in such a manner that both the primary magnetic flux and the leakage flux generated by the electromagnetic coil combine and contribute to generating the actuation force.

Some embodiments of solenoids according to our invention also utilize two conical surfaces strategically placed and configured to work in unison to provide increased actuation force. Similar designs commonly use one working air gap and one air gap parallel to the plunger to complete the magnetic flux circuit. The two cone arrangement shown turns the second air gap into a working air gap which eliminates the frictional forces at this gap common to the usual construction.

Also, in some embodiments of our invention, the solenoid coil includes a pair of electrically isolated electrical windings that are wound in a bifilar manner to provide a solenoid that can produce a substantially identical amount of actuation force, for a given stroke and current draw, from either of two independent sources of electrical current.

The solenoid of our invention also includes drain passages for removal of condensation from the conical airgaps defined by the conical surfaces of the plunger and the electromagnetic coil. The conical surfaces themselves are coated with a material resistant to retention of a condensate thereupon. The coating causes condensation on the surfaces to run off and be conducted through the passages out of the airgap.

These features for removing condensate from the air gaps are particularly important in a device, such as an aircraft asymmetry brake, that may develop condensation on surfaces located outside of the pressurized cabin spaces when the aircraft lands in a humid environment after a period of operation at high altitude where the temperature may be −40 to −65° F. When the aircraft lands after a prolonged cruise at such temperatures, surfaces external to the pressurized cabin, such as the conical surfaces of our solenoid may still be very cold. Water vapor from the air will condense on such cold surfaces. As long as the aircraft is on the ground, such condensation normally does not interfere with operation. But if the aircraft should then take-off and climb to high altitude, the condensate will freeze, and potentially inhibit operation of the solenoid. Temperature-altitude testing of the solenoid of our invention has indicated that the drain passages and coating of our invention can prevent such a problem with essentially no weight or negative operational impact on the solenoid.

In fact, where a thick enough coating is applied, the coating actually enhances operation of the solenoid by acting like an air gap to more rapidly dissipate magnetic flux generated by the coil, when the solenoid is de-energized. By more rapidly dissipating the magnetic flux, the coating allows the plunger of the solenoid to begin moving away from the electromagnetic coil more quickly than it could if the conical surfaces made metal-to-metal contact with one another. The coating thus reducing the time it takes to re-engage the jaw clutch and providing a significant operational advantage in a braking apparatus, such as an aircraft asymmetry brake, which must engage virtually instantaneously to stop further rotation of the drive shaft stationary after a failure in a flight control system.

These and other aspects and advantages of our invention will be apparent to those having skill in the art upon consideration of the following drawing figures and detailed descriptions of exemplary embodiments of our invention.

DESCRIPTION OF THE INVENTION

Figure 1:
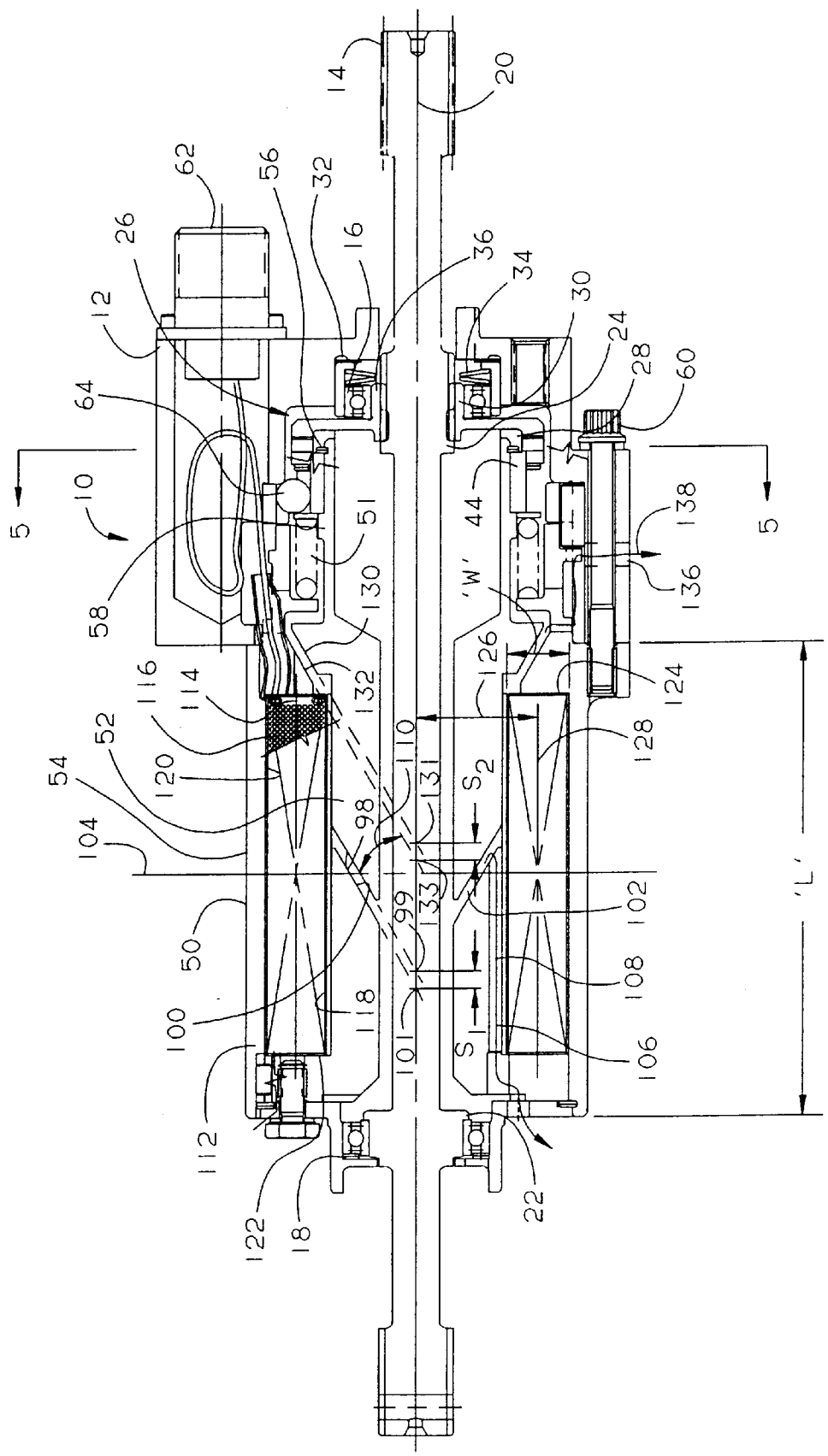
FIG. 1 is a longitudinal cross-section of an exemplary embodiment of a braking apparatus according to our invention, illustrating the brake in a locked, or engaged, position with the solenoid de-energized.

FIG. 1 depicts an exemplary embodiment of our invention in the form of an asymmetry brake 10 including a housing 12 having a rotating member in the form of a shaft 14 mounted therein by bearings 16, 18 for rotation relative to the housing 12 about an axis of rotation 20.

A jaw type clutch, generally indicated as referenced numeral 26, is disposed about the axis 20. The jaw clutch 26 includes a rotating element 28 thereof operably connected to the shaft 14 by means of a spline 30 or similar type of connection which constrains the rotating element 28 to rotate with the shaft 14, but allows the rotating element 28 to move axially to the right with respect to the shaft 14.

The inner race of the bearing 16 is journaled over a hub portion 36 of the rotating element 28. The outer race of the bearing 16 is guided within a bearing liner 32 pressed into the housing 12 in a manner allowing the bearing 16 to move freely in an axial direction with the rotating element 28. A stack of belleville washers 34 disposed between the liner 32 and the outer race of the bearing 16 pre-load the rotating element 28 against a shoulder 24 formed integrally with the shaft 14. This pre-load is transformed through the rotating element into the shaft 14, and subsequently transferred from the shaft 14 to the housing 12, via a second shoulder 22 formed integral with the shaft 14 and the bearing 18, to constrain the shaft 14 against unlimited movement along the axis 20.

Figure 2:
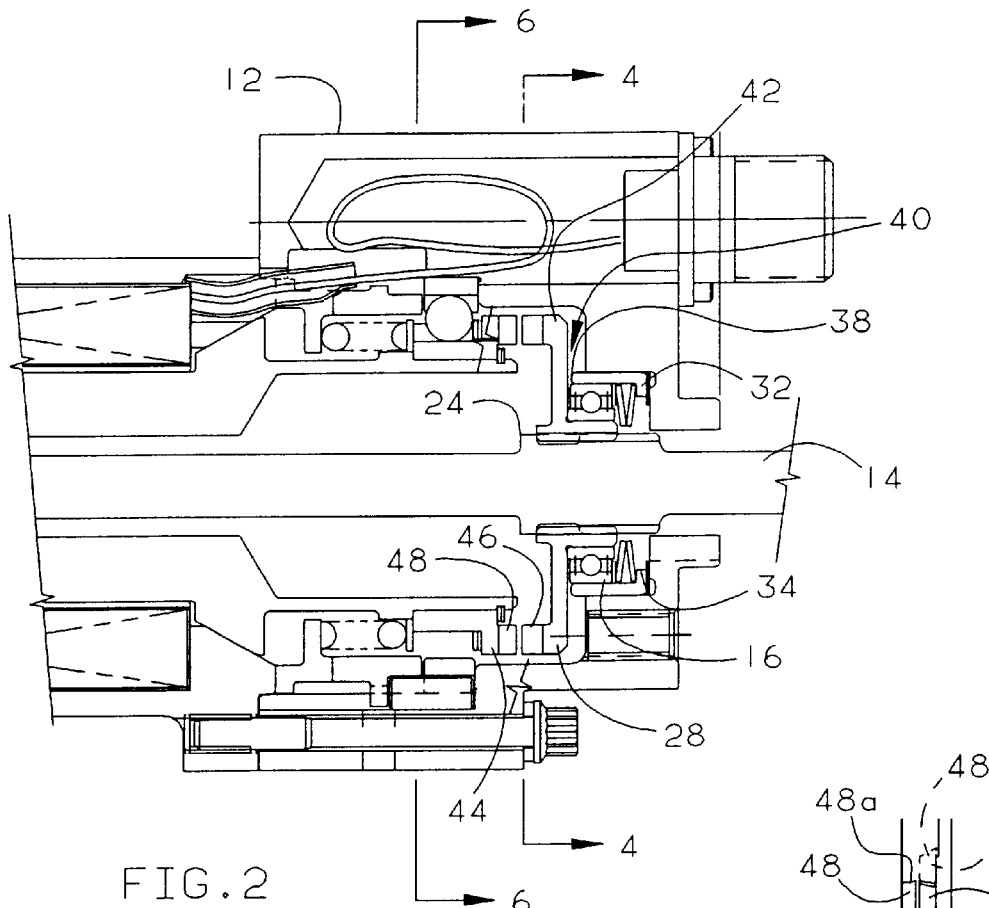
FIG. 2 is a partial sectional view of the braking apparatus illustrated in FIG. 1 showing the brake apparatus in an unlocked, or disengaged, position with the solenoid energized.

As best seen in FIG. 2, the liner 32 includes an axially extending stop 38 which defines a gap 40 between the stop 38 and a web portion 42 of the rotating element 28, when the belleville springs 34 are biasing the bearing 16 and rotating element 28 against the shoulder 24 of the shaft 14. The shoulder 24 of the shaft 14 and the stop portion 38 of the liner 32 in combination thus provide a means for limiting the rotating element 28 against unlimited axially movement with respect to the shaft 14 after the solenoid is de-energized.

Figure 3:
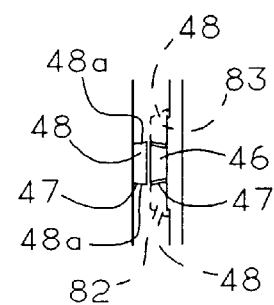
FIG. 3 is a sectional view taken along line 3—3 of FIG. 4 illustrating construction details of jaw teeth on a rotating and a translating element of a jaw clutch according to our invention.
Figure 5:
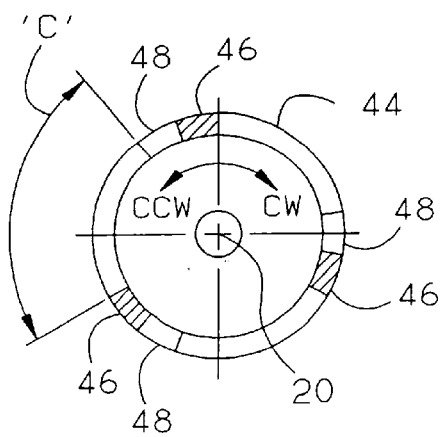
FIG. 5 is a transverse view taken along line 5—5 of FIG. 1 illustrating features of the rotating and translating elements of the jaw clutch of the exemplary embodiment depicted in FIGS. 1 and 2.
Figure 4:
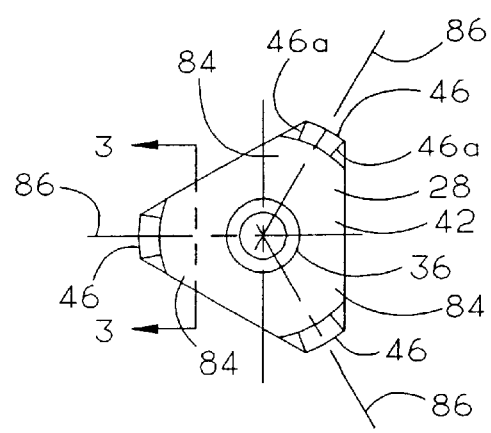
FIG. 4 is a view taken along line 4—4 of FIG. 2 illustrating a rotating element of the jaw type clutch of FIGS. 1 and 2.

Returning to FIG. 1, the jaw clutch 26 also includes a translating element 44 operatively connected to the housing 12 in a manner, to be described in greater detail below, which allows the translating element 44 to move axially with respect to the housing 12 from a locked position as depicted in FIG. 1 to an unlocked axial position as depicted in FIG. 2, and in a manner constraining the translating element 44 against unlimited rotation about the axis 20 with respect to the housing 12. The rotating and translating elements 28, and 44 respectively, each include complimentary jaw tooth means 46, 48 respectively extending axially therefrom in a juxtaposed relationship, as best seen in FIGS. 3–5, for engagement of the rotating and translating elements 28, 44 in an interlocking relationship with one another when the translating element 44 is disposed in the locked position as depicted in FIG. 1.

As shown in FIG. 1, actuator means in the form of an electrical solenoid 50, and a helical spring 51, are provided for moving the translating element 44 between the locked and unlocked axial positions. The helical spring 51 is operably disposed between the housing 12 and the translating element 44 in a manner urging the translating element to move toward the right from the unlocked position depicted in FIG. 2 to the locked position depicted in FIG. 1.

The solenoid 50 includes a plunger 52 disposed about the axis 20 and attached to the translating element 44 by a shoulder 58 and a snap ring 56 extending from the plunger 52, in a manner constraining the translating element 44 to move axially with the plunger 52. The solenoid 50 also includes an electromagnetic coil assembly 54 disposed about the plunger 52 and fixedly attached to the housing 12 by bolts 60. The electromagnetic coil 54 is configured to produce a magnetic field intersecting the plunger 52, when the coil 54 is supplied with electrical current via connector 62 from a source of electrical current, (not shown) for inducing an electromotive force on the plunger 52 acting in a direction urging the plunger 52 to move the translating element 44 from the locked position illustrated in FIG. 1 to the unlocked axial position illustrated in FIG. 2.

Figure 6:
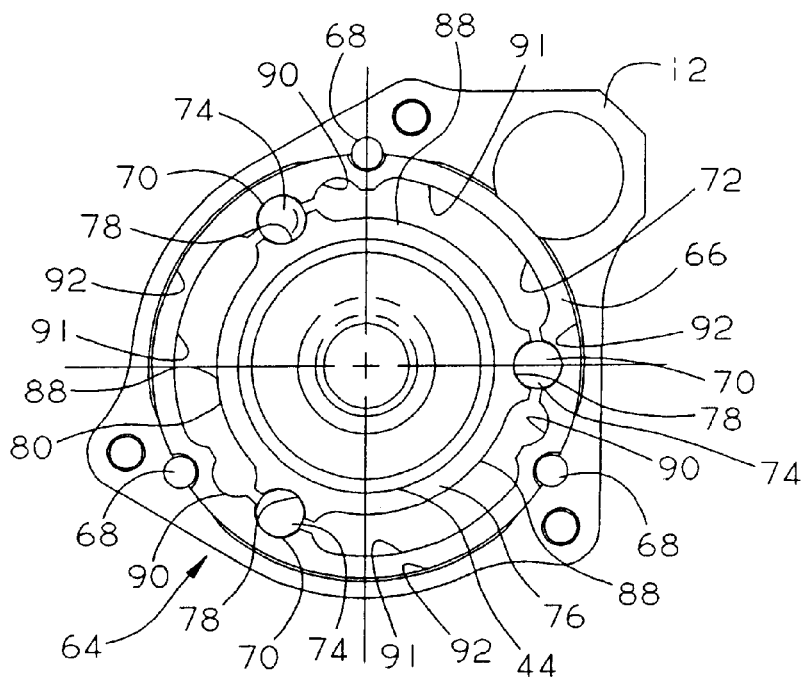
FIG. 6 is a transverse view of a ball spline of the braking assembly depicted in FIGS. 1 and 2 taken along line 6—6 of FIG. 2.

As shown in FIGS. 1 and 6, the asymmetry brake 10 also includes ball spline means 64 operably disposed between the translating element 44 and the housing 12, for operably connecting the translating element 44 to the housing 12 in a manner allowing the translating element 44 to move axially, with respect to the housing 12, between the locked and unlocked positions of the translating element 44, and constraining the translating element 44 against unlimited rotation about the axis 20 with respect to the housing 12. As best seen in FIG. 6, the ball spline means 64 includes an outer race 66 operably connected to the housing 12 by torque reacting pins 68 for constraining the outer race 66 against rotation relative to the housing 12. The outer race 66 also defines a plurality of circumferentially spaced axially oriented ball tracks 70, in a radially inner surface 72 of the outer race 66, for receipt of ball bearings 74. The ball spline means 64 also includes an inner race 76 integrally attached to the translating element 44 for movement therewith. The inner race 76 also defines a plurality of circumferentially spaced axially oriented ball tracks 78 in a radially outer surface 80 of the inner race 76. The ball tracks 78 in the radially outer surface 80 of the inner race 76 are juxtaposed and generally circumferentially aligned with the ball tracks 70 of the outer race 66 for receipt of the ball bearings 74. The ball bearings 74 disposed within the ball tracks 70, 80 of the outer and inner races 66, 76 operably connect the inner and outer races 66, 76 in such a manner that the inner race 76 is constrained against unlimited relative rotation with respect to the outer race 66 about the axis 20, and such that the inner race 76 may translate axially with respect to the outer race 66, through substantially rolling motion of the ball bearings 74 traveling in an axial direction within the ball tracks 70, 78. The rolling motion of the ball bearings in the axial direction within the ball tracks 70, 78 significantly reduces the internal frictional load of the brake apparatus 10 that the solenoid 50 must overcome to apply or release the brake 10.

As shown in FIG. 5, the complimentary jaw teeth 46, 48 of the rotating and translating elements 28, 44 respectively of the jaw clutch 26 are configured to provide a backlash clearance 'C' between mating adjacent pairs of mating jaw teeth 46, 48 when the translating element 44 is disposed in the locked position. The backlash clearance 'C' allows a limited amount of relative rotation of the translating and rotating elements 44, 28 between a first locked position, as illustrated by FIG. 5 and at reference numeral 82 of FIG. 3 whereat the translating element 44 constrains the rotating element 28 against rotation in a counterclockwise direction about the axis 20, and a second locked position as illustrated at 84 in FIG. 3 whereat the translating element 44 constrains the rotating element 28 against rotation in an opposite clockwise direction about the axis 20.

The jaw teeth 46, 48 of the exemplary embodiment depicted in FIGS. 3–5 are configured to include mating faces 46a, 48a having negative rake angles 47 for locking the teeth 46, 48 together, in a manner resisting axial movement of the translating element 44 relative to the rotating element 28, when the teeth 48 of the translating element are engaged with the teeth 46 of the rotating element 44 in either the first or second locked positions 82, 84.

The jaw clutch 26 and ball spline means 64 of the exemplary braking apparatus 10 of our invention are also configured to reduce or absorb shock loads imposed on the various internal components of the braking apparatus 10 when the jaw clutch 26 is engaged. As shown in FIG. 4, the web portion 42 of the rotating element is configured to form a plurality of arm-like web portions 84 extending generally radially outward from the hub portion 36 for operably connecting the jaw teeth 46 of the rotating element 28 to the hub 36. Each arm-like web portions 84 of the rotating element 28 extends along a generally radially directed twisting axis 86 passing through the axis 20 of the shaft 14. Configuring the web 42 of the rotating element 28 in this fashion provides two advantages with respect to reducing and absorbing shock loads imposed on the internal components when the jaw clutch 26 is engaged. First, by cutting away a portion of the web between adjacent teeth 46, the rotational inertia generated by the rotating element 28 which must be reacted when the jaw clutch 26 engages is reduced. Second, the arm-like web portions 84 allow a limited twisting motion of each of the arm-like web portions 84 and the tooth 46 attached thereto about its respective twisting axis 86, for absorbing circumferentially directed shock forces generated by engagement of the teeth 46 of the rotating element 44 with the teeth 48 of the translating element 44 of the jaw tooth clutch 26.

The ball spline means 64 are also configured to provide means for absorbing circumferentially directed shock loads generated by engagement or disengagement of the translating element 44 with the rotating element 28. As shown in FIG. 6, the inner race 76 includes relief cuts 88, in the outer surface 80, disposed between circumferentially adjacent ball tracks 78 for providing a pre-determined radial and circumferential flexibility of the inner race 76, allowing the inner race 76 to absorb circumferentially directed shock loads through bending of the inner race 76 between the ball tracks 78.

The outer race 66 also includes relief cuts 90, 91 in the radially inner wall 72 thereof disposed in portions of the outer race 66 extending between circumferentially adjacent ball tracks 70. In similar fashion to the relief cuts 88 in the inner race, the relief cuts 90, 91 in the outer race 66 provide a pre-determined radial flexibility of the outer race 66 for absorbing circumferentially directed shock loads through bending of the outer race 66 in the portions of the outer race 66 extending between adjacent ball tracks 70.

The housing 12 also includes relief cuts 92 disposed adjacent the portion of the outer race 66 extending between the ball tracks 70 for providing clearance for the bending of the outer race 66 in the portion thereof extending between adjacent ball tracks 70.

Figure 7:
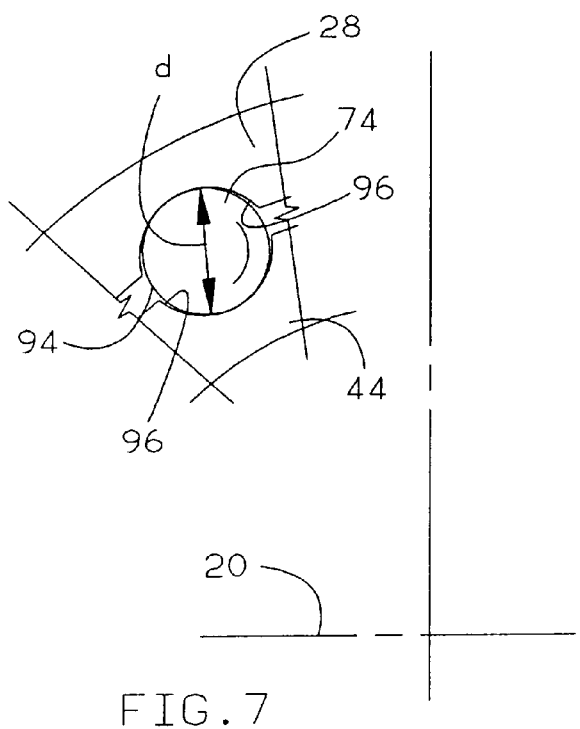
FIG. 7 is an enlarged view of a portion of the ball spline depicted in FIG. 6.

As shown in FIG. 7, the ball bearings 74 in the exemplary embodiment of the brake 10 have a diameter 'd' defining a radially outer surface 94 thereof. The ball tracks 70, 78 in the inner and outer races 76, 66 and the ball bearings 74 are mutually configured and radially disposed to provide a closely toleranced fit of the outer surfaces 94 of the ball bearing 74 in the ball tracks 70, 78 in a radial direction with respect to the axis 20 when the ball tracks 78 in the inner race 76 are circumferentially aligned in a radially juxtaposed relationship with the ball tracks 70 in the outer race 66. The ball tracks 78, 70 in the inner and outer races 76, 66 are further configured to define ball ramps 96 for applying bending forces to the inner and outer races 76, 66 when the races are urged to rotate relative to one another about the axis 20 from the relative position illustrated in FIG. 6 whereat the ball tracks 78 and the inner race 76 are circumferentially aligned in a radially juxtaposed position with the ball tracks 70 in the outer race 66.

As shown in FIG. 6, the ball tracks 70 and the outer race 66 are circumferentially disposed relative to the torque reacting pins 68 about the axis 20 of the shaft 14 in an angular relationship pre-determined to provide a desired circumferential stiffness of the ball race means 66. Specifically, as shown in FIG. 6, the three ball bearings 74 of the exemplary embodiment are angularly displaced from the three torque reacting pins 68 in a manner respectively creating one short and one long relief cut 90, 91 between adjacent torque reacting pins 68, rather than being positioned an equal angular distance from adjacent torque reacting pins 68. Those having skill in the art will readily recognize that as the ball bearings 74 are moved closer to an equal distance angular relationship between adjacent torque reacting pins 68, the circumferential and radial stiffness of the ball spline means 64 will be reduced. Those skilled in the art will further recognize that by adjusting the angular relationship between the balls 74 and the torque reacting pins 68, the shape of the relief cuts in the inner and outer races 76, 66, and by adjusting the number and mutual configuration of the ball bearings 74 and the ball ramps 96 utilized in the ball spline device 64, a desired circumferential stiffness of a ball spline mechanism 64 according to our invention can be readily provided to meet the needs of a particular embodiment of a device incorporating the ball spline 64 of our invention.

The shock absorbing features of the ball spline 64 and jaw clutch 26 of our invention described above allow an asymmetry brake 10 as shown in FIGS. 1–7 to engage and stop a shaft rotating at about 1500 rpm in a total time of less than about 0.05 seconds, without any of the additional shock absorbing devices, made from an elastomer, etc., that are required to protect the internal components of prior asymmetry brakes.

The plunger 52 and electromagnetic coil 54 of the solenoid 50 of the exemplary embodiment of the braking apparatus 10 respectively include a portion of a radially outer and inner surface thereof configured to define first generally conically shaped surfaces 98, 100. Each of the respective first conical surfaces 98, 100 converge toward a respective apex 99, 101 of a cone defined by that conical surface, with the apex of each of the defined cones coinciding with the axis 20 in such a manner that the first conical surfaces 98, 100 converge toward their respective apexes 99, 101 in a direction consistent with axial motion of the plunger 52 when the translating element 44 moves from the locked position shown in FIG. 1 to the unlocked axial position as shown in FIG. 2. The first conical surfaces 98, 100 define a generally annular conical first air gap 102 therebetween when the translating elements 44 is in the locked axial position as depicted in FIG. 1. As shown in FIG. 1, the plunger 52 and electromagnetic coil 54 are configured such that the first conical surfaces 98, 100 and air gap 102 are equally disposed axially about a plane 104 extending perpendicularly through the axis 20 at a point on the axis 20 substantially bisecting an axial length 'L' of the electromagnetic coil 54.

The electromagnetic coil 54 also includes a drain passage 106 for conducting a flow of fluid away from the first air gap 102, as indicated by arrows 108. The first conical surfaces 98, 100 are also coated with a thickness of about 0.002 inches of a material which is resistant to retention of a condensate thereupon, in order to cause any fluid condensing on the first conical surfaces 98, 100 to run down through the first air gap 102 and be conducted away from the air gap 102 by the drain means 106. A material such as a product sold under the trade name Wear Cote plus $CF_x$ by Wear Cote International, Co. of Rock Island, Ill. has been found to provide not only the desired resistance to retention of condensate, but also provides a measure of anti-corrosion protection for the first conical surfaces 98, 100. The Wear Cote material is a combination of a fluorinated carbon and nickel which is applied by a procedure similar to that used for applying electroess nickel plating.

In addition to providing resistance to moisture retention and corrosion, the coating on the conical surfaces of the plunger and electromagnetic coil 52,54 enhances operation of the solenoid 50 by acting like an air gap to more rapidly dissipate magnetic flux generated by the coil 54, when the solenoid 50 is de-energized. By more rapidly dissipating the magnetic flux, the coating allows the plunger 52 of the solenoid 50 to begin moving away from the electromagnetic coil 54 more quickly than it could if the conical surfaces 98, 100 made metal-to-metal contact with one another. The coating, thus reducing the time it takes to re-engage the jaw clutch 26 and providing a significant operational advantage in a braking apparatus, such as an aircraft asymmetry brake, which must virtually instantaneously to stop further rotation of the drive shaft stationary after a failure in a flight control system.

Conical air gaps such as the first air gap 102 of the solenoid of our invention are known to produce a solenoid with a reduced current draw for a given stroke length by virtue of the angular relationship between the stroke and an effective air-gap distance measured perpendicular to the conical surfaces. Although theoretical calculations would indicate that a cone angle 110 as small as possible between the conical surfaces 98, 100 and the axis 20, as shown in FIG. 1, would create the longest stroke with the smallest current draw, our experience has shown that a cone angle 110 of about 30° with respect to the axis 20 provides an optimum stroke length for a given current draw.

As shown in FIG. 1, the electromagnetic coil 54 includes a core 112 defining a generally annular shaped cavity 116 therein disposed about the axis 20 for receipt of an electrical winding 114. The core 112 defines radially inner and outer walls 118, 120 of the annular shaped cavity 116, connected by radially extending end walls 122, 124 at both axial ends of the annular cavity 116. The end walls 122, 124 have a radial width 'W' centered about a mean radius 126 of the annular cavity 116 extending radially outward from the axis 20 to define a cylindrical plane 128 generally radially bisecting the annular shaped cavity 116.

The electrical winding 114 is configured to produce a magnetic field intersecting the plunger 52 when the winding is supplied with electrical current via connector 62 from a source of electrical current, for inducing an electromotive force on the plunger 52 in a direction urging the plunger to move the translating element 44 from the locked position illustrated in FIG. 1 to the unlocked axial position illustrated in FIG. 2. The winding 114 includes a plurality of layers of turns helically wound in a continuous manner about the radially inner wall 118 of the core 112, with each turn of the winding 114 substantially abutting a previous turn, and each layer overlaying a previous layer, such that the winding 114 extends radially completely across the radial width 'W' of the end walls 124, 122 and substantially fills the annular shaped cavity 116, as shown in FIGS. 1 and 2.

As shown in FIG. 1, the plunger 52 and electromagnetic coil 54 of the exemplary embodiment also each include a second portion of the radially outer and inner surfaces thereof respectively configured to define complimentary second generally conically shaped surfaces 130, 132 thereof. Each of the respective conical surfaces 130, 132 converge toward a respective apex 131, 133 of a cone defined by that second conical surface coinciding with the axis 20 in such a manner that the second conical surface 130 of the plunger 52 converges toward its respective apex 131 in a direction consistent with axial motion of the plunger 52 when the solenoid 50 is urging the translating element 44 to move from the locked to the unlocked positions, or to the left as depicted in FIG. 1 and FIG. 2, in similar fashion to the first conical surface 98 of the plunger as described above. The second conical surfaces 130, 132 define a second generally annular conical air gap 134 therebetween, having an axial length $S_2$ substantially equal to an axial length $S_1$ of the first air gap 102 when the translating element 44 is in the locked axial position as depicted in FIG. 1.

The second conical surfaces 130, 132 of the plunger 52 and electromagnetic coil 54 are radially and axially disposed such that the second conical surfaces 130, 132 and second air gap 134 are equally disposed radially about the cylindrical planes 128 defined by the mean radius 126 of the annular cavity 116. The second conical surfaces and second air gaps 130, 132, 134 are further disposed axially adjacent to the second radially extending end wall 124 of the annular cavity 116.

The second conical surfaces 130, 132 of the plunger and electromagnetic coil 52, 54 are coated with a material resistant to retention of a condensate thereupon in similar fashion to that described above with respect to the first conical surfaces 98, 100. The braking apparatus 10 also defines a second drain means, generally indicated at 136, for conducting a flow of fluid away from the second air gap 134 and out of the braking apparatus 10, as indicated by arrow 138 in FIG. 1.

Those skilled in the art will readily recognize that by positioning the second conical surfaces 130, 132 and second air gap 134 as described above, both the primary flux and leakage flux generated by the winding 114 and core 112 pass through the second air gap 134, and combine to create more actuation force on the plunger for a given current draw supplied to the winding 114 than would be achievable if the second conical surfaces and air gap 130, 132, 134 were located at another position whereat the leakage flux could not be utilized. Our experience has also shown that by adding the second conical surfaces 130, 132 and air gap 134 configured in the manner described above, the plunger 52 tends to center itself better within the electromagnetic coil 54, than in other possible arrangements where the second surface and air gap 130, 132, 134 are angled in a direction opposite to the angle of first conical surface, or where the second conical surfaces and air gap are located at the radially outer edge of the electromagnetic coil 54. The improved centering of the plunger provided by the second surfaces 130, 132 and air gap 134 serves to keep the plunger from dragging against the electromagnetic coil 54, thereby reducing inherent friction between the plunger 52 and coil 54 in such a manner that a larger proportion of the electromotive force imparted to the plunger 52 by the coil 54 is usable as actuation force for moving the plunger 52.

For the specific embodiment of our invention depicted in the braking apparatus 10 illustrated in FIGS. 1–7, therefore, the spring 51 will urge the jaw teeth 46 of the rotating elements 28 of the jaw clutch 26 to engage the teeth 48 of the translating element 44 when the winding 114 is not being supplied with electrical current.

To release the brake 10, electrical current is supplied to the winding 114 for energizing the solenoid 50 to produce an electromotive force urging the plunger 52 to move to the left as depicted in FIGS. 1 and 2, from the locked position depicted in FIG. 1 to the unlocked position depicted in FIG. 2. The backlash clearance 'C' allows the rotating element 26 to rotate a small angular distance about the axis 20 to release the negatively raked teeth 46, 48 from one another so that the plunger 52 can pull the translating element 44 away from the rotating element 28 to release the brake 10.

To apply the brake, electrical current to the winding 114 is cut off, causing the spring 51 to drive the translating element 44 to the right as depicted in FIG. 1, so that the teeth 48 of the translating element may engage and lock with the teeth 46 of the rotating element 28 to stop the shaft 14 from rotating.

When the teeth 48 of the translating element 44 contact the teeth 46 of the rotating element 28 during engagement of the brake 10, the arm like web 84 of the rotating element 28, in combination with the flexible inner and outer races 76, 66 and ball ramp means 96 of the ball spline 64, absorb the circumferentially directed shock generated by contact between the translating and rotating elements 44, 28. As the teeth 48 of the translating element 44 contact the teeth 46 of the rotating element 28, axially directed impact forces cause the rotating element 28 to move axially to the right as depicted in FIG. 2 such that the web portion 42 of the rotating element 28 is driven into contact with the stop 38 of the liner 32, against the force of the belleville spring 34, in such a manner that the axially directed impact forces are not applied across the bearing 16, but are transferred into the housing 12 through the liner 32.

Figure 8:
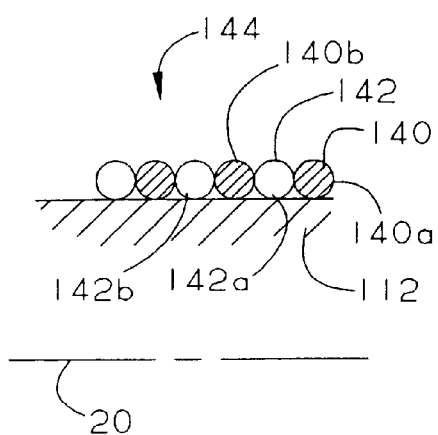
FIG. 8 is a schematic representation of an alternate embodiment of a bifilar winding for use in a braking assembly according to our invention.

FIG. 8 illustrates an alternate embodiment of our invention in which the electromagnetic coil includes a pair of first and second electrical windings 140, 142 wound about the core 112 to form a bifilar winding 144, having axially alternating turns 140a,b; 142a,b; etc., of the first and second windings 140, 142 wound in a paired, helical, axially side-by-side manner about the core 112, with each subsequent pair of turns substantially abutting a previous pair of turns. Each of the first and second windings 140, 142 of the bifilar winding 144 are electrically isolated from one another and independently adapted for connection to a separate source (not shown) of electrical current. Through utilization of such a bifilar winding 144, each of the first and second windings 140, 142 will independently generate sufficient electromotive force for moving the translating element from the locked to the unlocked axial position. Unlike other arrangements for forming two windings on the same core, such as stacking them axially, or winding the second winding 142 radially over the top of the first winding 140, the bifilar winding 144 as described above generates a substantially identical electromotive force on the plunger for a given value of current supplied to either the first or second winding 140, 142.

From the foregoing description, those having skill in the art will readily recognize that our invention overcomes problems encountered in prior braking devices and provides an improved braking apparatus suitable for use in applications for requiring a physically compact, powerful and highly reliable braking device, that includes a minimal number of parts of straightforward design that can be produced at reasonable cost. Those having skill in the art will also recognize that the braking apparatus of our invention can readily be incorporated into aircraft actuation system hardware, and provides a unique solution to the problems of fitting an asymmetry brake into the limited envelope available in the supercritical wing of the new aircraft described above in the Background section of this application.

Those having skill in the art will further recognize that although we have described our invention herein with respect to specific embodiments and applications thereof, many other embodiments and applications of our invention are possible within the scope of our invention as described in the appended claims. For example, our invention is not limited to asymmetry brakes for use in aircraft actuation systems, but may be used with equal utility anywhere a compact powerful braking device of a highly reliable robust construction is required.

We also wish to specifically point out that the individual novel elements of our invention as described herein, such as the solenoid with dual conical surfaces, the shock absorbing ball spline device 64, and the self-locking shock absorbing jaw clutch, of our invention can be used individually or in other combinations than those specifically described herein within the scope of the appended claims.

It is understood, therefore, that the spirit and scope of the appended claims should not be limited to the specific embodiment described and depicted herein.

We claim:

1. A braking apparatus comprising:

a) a housing;

b) a shaft operably connected to said housing in a manner allowing said shaft to rotate relative to said housing about an axis of rotation and constraining said shaft against movement along said axis with respect to said housing;

c) jaw clutch means disposed about said axis including:
a rotating element thereof operably connected to said shaft in a manner constraining said rotating element for rotation with said shaft and against unlimited axial movement with respect to said shaft;
a translating element thereof operably connected to said housing in a manner constraining said translating element for axial movement with respect to said housing between a locked and an unlocked axial position of said translating element, and against unlimited rotation about said axis with respect to said housing;
said rotating and translating elements each including complementary jaw tooth means extending axially therefrom in a juxtaposed relationship for engagement of said rotating and translating elements in an interlocking relationship with one another when said translating element is disposed in said locked position;

d) actuator means for moving said translating element between said locked and unlocked axial positions; and e) ball spline means operably disposed between said translating element and said housing for operably connecting said translating element of said jaw clutch means to said housing in said manner constraining said translating element for axial movement with respect to said housing between said locked and unlocked axial positions of said translating element, and against said unlimited rotation about said axis with respect to said housing.

2. The braking apparatus of claim 1 wherein said complimentary jaw tooth means of said rotating and translating elements of said jaw clutch means are configured to provide a backlash clearance between adjacent pairs of mating jaw teeth when said translating element is disposed in said locked position for allowing a limited amount of relative rotation of said translating and rotating elements between:

a first locked position of said jaw clutch means whereat said translating element constrains the rotating element against rotation in one direction about the axis; and a second locked position whereat said translating element constrains the rotating element against rotation in an opposite direction about the axis.

3. The braking apparatus of claim 2 wherein said complementary jaw tooth means are configured to include mating faces having negative rake angles for locking said teeth together in a manner resisting axial movement of said translating element relative to said rotating element when said teeth of said translating element are engaged with said teeth of said rotating element in either said first or said second locked position.

4. The braking apparatus of claim 1 wherein said rotating element includes a hub portion attached to said shaft and a plurality of arm-like web portions thereof extending generally radially outward therefrom for operably connecting said jaw tooth means of said rotating element to said hub;

with each arm-like web portion of said rotating element extending along a generally radially directed twisting axis passing through said axis of said shaft and providing operative connection of a single jaw tooth of said rotating member to said hub;

said arm-like web portions being configured to allow a limited twisting motion of said arm-like web portion and tooth about its twisting axis for absorbing circumferentially directed shock forces generated by engagement of said teeth of said rotating element with said teeth of said translating element of said jaw tooth means.

5. The braking apparatus of claim 1 wherein:

said rotating element includes a hub portion thereof attached to said shaft and a web portion thereof extending generally radially outward from said hub portion for operably connecting said jaw tooth means of said rotating element to said hub;

said hub being operably attached to said shaft by means for allowing a limited axial movement of said rotating element along said axis for absorbing axially directed shock forces generated by engagement of said jaw clutch means.

6. The braking apparatus of claim 5 wherein said rotating element defines an axial length thereof and said means for allowing a limited axial movement includes:

a) first stop means attached to said shaft;

b) second stop means attached to said housing; and c) spring means operably connected between said housing and said rotating element for urging said rotating element into contact with said first stop means;

said first and second stop means being axially disposed apart a distance equal to the sum of said limited axial movement plus said axial length of said rotating element such that when said jaw clutch means are engaged said rotating element may move through an axial distance equal to said limited axial movement against the urging of said spring for absorbing axially directed shock forces generated by engagement of said jaw clutch means.

7. The braking apparatus of claim 1 wherein said ball spline means comprises:

a) an outer race operably connected to said housing by torque reacting means for constraining said outer race against rotation relative to said housing, and defining a plurality of circumferentially spaced axially oriented ball tracks in a radially inner surface thereof for receipt of ball bearings;

b) an inner race fixedly attached to said translating element for movement therewith, and defining a plurality of circumferentially spaced axially oriented ball tracks in a radially outer surface thereof juxtaposed and generally circumferentially aligned with said ball tracks of said outer race for receipt of ball bearings; and c) a plurality of ball bearings disposed within said ball tracks of said inner and outer races for providing operative connection between said inner and outer races such that said inner race is constrained against unlimited relative rotation with respect to said outer race about said axis, and such that said inner race may translate axially with respect to said outer race through substantially rolling motion of said ball bearings traveling in an axial direction in said ball tracks.

8. The braking apparatus of claim 7 wherein said ball spline means are configured to provide means for absorbing circumferentially directed shock loads generated by engagement or disengagement of said teeth of said translating element with said rotating element.

9. The braking apparatus of claim 8 wherein said inner race includes relief means disposed between circumferentially adjacent ball track means in the inner race for providing a predetermined radial flexibility of said inner race for absorbing said circumferentially directed shock loads through bending of the inner race between the ball track means.

10. The braking apparatus of claim 8 wherein said outer race includes relief means disposed in a portion of said outer race extending between circumferentially adjacent ball track means in the outer race for providing a predetermined radial flexibility of said outer race for absorbing said circumferentially directed shock loads through bending of the outer race in said portion thereof extending between said adjacent ball track means.

11. The braking apparatus of claim 10 wherein said housing includes relief means therein disposed adjacent said portion of said outer race extending between said ball track means for providing clearance for said bending of the outer race in said portion thereof extending between said adjacent ball track means.

12. The braking apparatus of claim 8 wherein:

said ball bearings have a diameter defining a radially outer surface thereof;

said ball track means in said inner and outer races and said ball bearings mutually are configured and radially disposed to provide a closely toleranced radial fit of said radially outer surface of said ball bearings in said ball track means when said ball track means in said inner race are circumferentially aligned in a radially juxtaposed relationship with said ball track means in said outer race; and said ball track means in said inner and outer races and said ball bearings further mutually are configured to define ball ramp means for applying bending forces to said inner and outer races when said races are urged to rotate relative to one another about said axis from said relative position whereat said ball track means in said inner race are circumferentially aligned in a radially juxtaposed relationship with said ball track means in said outer race.

13. The braking apparatus of claim 7 wherein said ball track means in said outer race are circumferentially disposed relative to said torque reacting means about said axis of said shaft in a predetermined angular relationship for providing a desired circumferential stiffness of said ball spline means.

14. The braking apparatus of claim 1 wherein said actuator means includes spring means disposed between said housing and said translating element for urging said translating element into engagement with said rotating element.

15. The braking apparatus of claim 14 wherein said actuator means further includes an electrically powered solenoid operably connected between said housing and said translating element for urging said translating element to move from said locked to said unlocked axial position when said solenoid is supplied with electrical current from a source of electrical current, to thereby disengage said translating element from said rotating element.

16. The braking apparatus of claim 15 wherein said solenoid comprises:
    (a) a plunger disposed about said axis and attached to said translating element for axial movement therewith; and
    (b) an electromagnetic coil disposed about said plunger and fixedly attached to said housing;
        said electromagnetic coil being configured to produce a magnetic field intersecting said plunger, when said coil is supplied with electrical current from said source of electrical current, for inducing an electromotive force on said plunger in a direction urging said plunger to move said translating element from said locked to said unlocked axial position.

17. The braking apparatus of claim 16 wherein said plunger and electromagnetic coil respectively each include a portion of a radially outer and inner surface thereof configured to define complementary, first generally conically shaped, surfaces thereof;
    each of said respective first conical surfaces converging toward a respective apex of a cone defined by that conical surface, the apex of each of said cone coinciding with said axis in such a manner that said first conical surfaces converge toward their respective apices in a direction consistent with axial motion of said plunger when said translating element moves from said locked to said unlocked axial position;
    said first conical surfaces defining a generally annular conical first air gap therebetween when said translating element is in said locked axial position.

18. The braking apparatus of claim 17 wherein said electromagnetic coil defines an axial length thereof, and said plunger and electromagnetic coil are configured such that said first conical surfaces and air gap are equally disposed axially about a plane extending perpendicularly through the axis at a point on said axis substantially bisecting said axial length.

19. The braking apparatus of claim 17 wherein said first conical surfaces include means for removing a condensate therefrom.

20. The braking apparatus of claim 19 wherein said electromagnetic coil includes drain means for conducting a flow of fluid away from said first airgap, and said first conical surfaces are coated with a material resistant to retention of a condensate thereupon.

21. The braking apparatus of claim 20 wherein said material resistant to retention of a condensate thereupon includes a fluorinated carbon material.

22. The braking apparatus of claim 17 wherein said first conical surfaces define a cone having a cone angle of about 30 degrees with respect to said axis.

23. The braking apparatus of claim 18 wherein said electromagnetic coil comprises:
    a) a core defining an annular shaped cavity therein disposed about said axis for receipt of an electrical winding;
        said core defining radially inner and outer walls of said annular shaped cavity connected by radially extending endwalls at both axial ends thereof, said endwalls having a radial width centered about a mean radius of said annular cavity extending radially outward from said axis to define a cylindrical plane generally bisecting said annular shaped cavity;
    b) said electromagnetic coil further including an electrical winding disposed in said annular shaped cavity and adapted for connection to a source of electrical current;
        said winding being configured to produce said magnetic field intersecting said plunger, when said winding is supplied with electrical current from said source of electrical current, for inducing said electromotive force on said plunger in said direction urging said plunger to move said translating element from said locked to said unlocked axial position;
        said winding having a plurality of layers of turns helically wound in a continuous manner about said radially inner wall of said core with each turn substantially abutting a previous turn and each layer overlaying a previous layer such that said winding extends radially completely across said radial width of said endwalls to substantially fill said annular shaped cavity; and
    c) wherein said plunger and electromagnetic coil respectively each include a second portion of said radially outer and inner surfaces thereof configured to define complementary, second generally conically shaped, surfaces thereof;
    each of said respective second conical surfaces converging toward a respective apex of a cone defined by that second conical surface, the apex of each of said second conical surfaces coinciding with said axis in such a manner that said second conical surface of said plunger converges toward its respective apex in a direction consistent with axial motion of the plunger when said solenoid is urging said translating element to move from said locked to said unlocked axial position;
    said second conical surfaces defining a second generally annular conical air gap therebetween having an axial length substantially equal to said first air gap when said translating element in said locked axial position;
    said second conical surfaces of said plunger and electromagnetic coil being radially and axially disposed such that said second conical surfaces and second air gap are equally disposed radially about the cylindrical plane defined by said median radius of said annular cavity, and axially adjacent to one of said radially extending endwalls of said annular shaped cavity.

24. The braking apparatus of claim 23 wherein said second conical surfaces include means for removing a condensate therefrom.

25. The braking apparatus of claim 24 wherein said means for removing condensate includes drain means for conducting a flow of fluid away from said second airgap, and said second conical surfaces are coated with a material resistant to retention of a condensate thereupon.

26. The braking apparatus of claim 25 wherein said material resistant to retention of a condensate thereupon includes a fluorinated carbon material.

27. The braking apparatus of claim 23 wherein said first conical surfaces define a cone having a cone angle of about 30 degrees with respect to said axis.

28. The braking apparatus of claim 17 wherein said electromagnetic coil comprises:
   a) a core defining means disposed about said axis for receipt of an electrical winding;
   b) said electromagnetic coil further including a pair of first and second electrical windings wound about said core to form a bifilar winding having axially alternating turns of said first and second windings wound in a paired, helical, axially side-by-side manner about said core, with each pair of turns substantially abutting a previous pair of turns;
   each of said first and second windings of said bifilar winding being electrically isolated from one another and independently adapted for connection to separate sources of electrical current.

29. The braking apparatus of claim 28 wherein each of said first and second windings is configured to independently generate sufficient electromotive force for moving said translating element from said locked to said unlocked axial position.

* * * * *